United States Patent [19]

Teller et al.

[11] 4,293,524

[45] Oct. 6, 1981

[54] METHOD AND APPARATUS FOR COOLING AND NEUTRALIZING ACID GASES

[75] Inventors: Aaron J. Teller, Westboro; Denis R. J. Roy; Shih K. Lin, both of Shrewsbury, all of Mass.

[73] Assignee: Teller Environmental Systems, Inc., Worcester, Mass.

[21] Appl. No.: 160,443

[22] Filed: Jun. 18, 1980

Related U.S. Application Data

[63] Continuation of Ser. No. 944,076, Sep. 20, 1978, abandoned.

[51] Int. Cl.³ .................... B01J 10/00; B01D 53/34
[52] U.S. Cl. .................... 422/169; 422/176; 422/224; 423/210; 423/215.5; 423/239; 423/242; 55/235; 55/236; 55/260; 55/459 R; 261/79 A; 261/DIG. 54; 159/4 R; 159/4 B; 159/48 R
[58] Field of Search .................... 423/210, 220, 215.5, 423/235, 242; 261/DIG. 54, DIG. 26, 79 A; 55/235, 236, 260, 459 R; 159/4 R, 4 B; 48 R; 422/176, 224, 169

[56] References Cited

U.S. PATENT DOCUMENTS

| | | | |
|---|---|---|---|
| 2,494,465 | 1/1950 | Watson | 261/DIG. 54 |
| 2,632,523 | 3/1953 | Stephens et al. | 261/DIG. 54 |
| 3,048,956 | 8/1962 | Lundy et al. | 261/DIG. 54 |
| 3,064,408 | 11/1962 | Erga et al. | 261/DIG. 54 |
| 3,113,168 | 12/1963 | Kinney | 261/DIG. 54 |
| 3,488,039 | 1/1970 | Ekman | 261/DIG. 54 |
| 3,544,087 | 12/1970 | McIlvaine et al. | 261/DIG. 54 |

*Primary Examiner*—Earl C. Thomas
*Attorney, Agent, or Firm*—Thompson, Birch, Gauthier & Samuels

[57] ABSTRACT

A process and apparatus for neutralizing hot acid gases is disclosed. Prior to neutralizing the gas, it is introduced into a zone, e.g., a cyclone to establish an upwardly, generally spiral gas stream. This gas motion permits removal from the gas of larger particles which concentrate at the cyclone wall by centifugal forces. The upwardly-moving gas stream which may or may not have a spiral motion is contacted with an upwardly-moving spray of a basic neutralizing liquid or slurry under conditions such that the spray droplets moderately overcome gravitational forces such that they experience a sufficiently long residence time in the cyclone to be evaporated to dryness. The product gas from the cyclone then can be treated further to remove small particles and salt product.

4 Claims, 3 Drawing Figures

METHOD AND APPARATUS FOR COOLING AND NEUTRALIZING ACID GASES

This is a continuation, of application Ser. No. 944,076 filed Sept. 20, 1978, and now abandoned.

BACKGROUND OF THE INVENTION

This invention relates to a method and apparatus for cooling and neutralizing acid gases which utilizes a step of contacting the gas with a liquid spray.

The problems of emitting to the atmosphere industrial gases containing a high proportion of noxious substances have long been recognized. Acid gases such as the sulfur oxides, nitrogen oxides and the hydrogen halides are particularly common and undesirable components of industrial effluent gases. Bled to the atmosphere, such gases condense on water droplets forming strong acids and, blown about by wind, such droplets cause severe corrosion of metal parts and machinery even many miles from the industrial site. The direct danger to animal and vegetable life in such areas has been established. As a result, local ordinances and national regulations in the United States and various other countries have set increasingly strict limits on the permissible acid gas-content of effluent gases. A variety of methods have been proposed for dealing with this situation, but none has so far been wholly successful in dealing with the tri-partite problem of handling large volumes of hot effluent gas containing comparatively high concentrations of acid gases, reducing acid gas content to an acceptable level, and still maintaining an economical operation.

DESCRIPTION OF PRIOR ART

It has long been known to purify gas streams through contact with a solid sorbent material capable of selectively reacting with and/or physically sorbing the impurities from the gas stream. Sorptive materials were commonly employed in the form of filter cakes or beds of granular material as taught, for example, by U.S. Pat. Nos. 2,391,116, 2,526,776 and 3,197,942. However, many problems were associated with such methods. Packed sorption towers of the types heretofore employed were restricted in their use to the treatment of relatively small volumes of gaseous material. Larger volumes could not be efficiently processed through fixed bed towers because of the large pressure drop that occurs across the packing. The need for large amounts of power to force the gas through the beds made such processes uneconomical when the contaminant gas was present in concentrations below about 400 parts per million. Moreover, fixed bed towers experienced the problems of having "break-through" point, that is, the bed of sorbent material would gradually become saturated until, at a particular point, the level of efficiency would rapidly fall off. At this stage, a break-through of contaminants would occur and pollutants would escape until the system was either shut down and changed or the gas stream directed to a freshly packed tower. This was, quite simply, a batch operation. The serious problems of pressure drops, break-through points and discontinuous operations were found to exist in fluidized bed operations, such as that shown by U.S. Pat. No. 3,723,598, where the granular sorptive materials in a bed are agitated by the entering contaminated gas stream so that the aerated mass has a tendency to behave more as a fluid.

U.S. Pat. No. 2,919,174 discloses a process for removing fluoride contaminants from gas streams which avoids the high pressure drops and break-through points of certain of the prior art processes described above. This process consists of dispersing finely divided calcium carbonate ($CaCO_3$) or other basic salts of alkaline or alkaline earth metals in the gas stream containing fluoride contaminants and directing the particle-laden stream into a baghouse filter where a permeable layer of the alkaline material is allowed to build up. However, this process is deficient in other aspects in that it is limited to alkaline substances which will react with fluoride gases in the dry state. Furthermore, this process requires that a layer of the alkaline material be built up on the inside of the filter surface before it can become effective.

"Wet processes" are known in the prior art in which a tower is filled with a packing material and a liquid, such as water, through which a contaminated gas stream is passed. Wet washing of waste gases with aqueous solutions or slurries of manganese sulfate, calcium bicarbonate, lime, ammonia and sodium sulfite-bisulfite to remove sulfur dioxide was discounted in U.S. Pat. No. 3,551,093 as impractical because of the necessity of cooling the flue gas to below 100° C. (the boiling point of water) before sorption would take place. Furthermore, the high pressure drop across the packed tower and comparatively slow rate of diffusion of the gas through the liquid phase make this process impractical for large-scale operations.

It has also been proposed to simultaneously cool and neutralize a hot acid gas by contacting the gas with a spray of liquid droplets containing a neutralization agent. In these processes, the neutralization agent reacts with the acid gas to increase its pH to about 7. The quantity of water utilized in the spray or water-solid suspension is sufficient to reduce the gas temperature by evaporation of the water such that the reaction product and/or unreacted neutralizing agent is dry. Essentially complete dryness must be obtained otherwise an aqueous composition will collect on the bottom of the apparatus utilized which is corrosive and difficult to remove and which causes undesirable downtime of the equipment.

The apparatus utilized in this procedure generally is that used in spray dryers or in gas and liquid sprays, both proceed downward in a concurrent manner. In some limited applications, countercurrent flow is utilized wherein the gas proceeds upwardly and the liquid spray proceeds downwardly. However, this latter technique is generally undesirable since insufficient residence time of the gas and liquid spray in contact is achieved to effect substantially complete neutralization while attaining substantially complete evaporation of the contacting liquid. The problem of substantially complete dryness is complicated by the fact that it is common for industrial emissions to contain particulate matter which also must be removed. If the particulate concentrations are high, with loadings greater than about 0.5 grams/dscf, the particulates impact with the liquid spray to cause spray conglomerations and the formation of larger droplets which are more difficult to evaporate.

In forming the sprays such as with a single fluid nozzle or with two fluid nozzles or spinning discs, a size distribution of liquid particles is created. The smaller droplets evaporate rapidly while the larger droplets evaporate slowly. The size of the quench reactor must be established to provide "safe" exposure times in order to achieve complete evaporation of even the larger droplets. Thus, the size of the apparatus has grown excessively while not eliminating the questions of reliability when nozzle or disc liquid droplet distributions change with time or operating conditions. For example, if the diameter of the apparatus utilized provides for a gas velocity of 6 ft. per second and a droplet of 400 microns is formed, the initial downward velocity of the droplet is 6 ft. per second plus the terminal velocity of 5 ft. per second or 11 ft. per second net. If the evaporation time is 6 seconds and the particle size decreases to 40 microns at the dry state, the length of the quench reactor would necessarily be in the order of about 52 ft. Such an apparatus is expensive to build and maintain and is therefore undesirable.

It would be desirable to provide a means for neutralizing and cooling acid gases at rates which are commercially attractive without the necessity of large apparatus. Furthermore, it would be desirable to provide such an apparatus which gives substantially complete assurance that the gas is neutralized and the product gas composition is dry.

SUMMARY OF THE INVENTION

In accordance with this invention, a gas stream containing acid gases is caused to move in a generally spiral path in a preliminary treatment zone preceeding a reaction zone to remove relatively large particles which may be present in the acid gas. The acid gas, substantially free of these large particles is introduced upwardly in a reaction chamber and is contacted therein with an upwardly moving liquid or slurry spray which reacts to neutralize the acid gases. The liquid or slurry spray particles experience a long residence time in the reactor because the initial upward velocity of the particles resulting from pressure at the spray nozzle and the force of the upwardly moving gas is counterbalanced by gravity forces in a manner such that the spray particles move slowly upward within the reactor until the water therein is evaporated. By controlling the average particle size in the spray and the velocity of the upwardly moving gases, it is possible to achieve a substantial reduction in the size of the reactor thereby providing substantial economic benefits. This invention can be incorporated as the first step or a final step in an integrated process for removing acid gases and particulates from a gas stream.

DESCRIPTION OF SPECIFIC EMBODIMENTS

Figure 1:
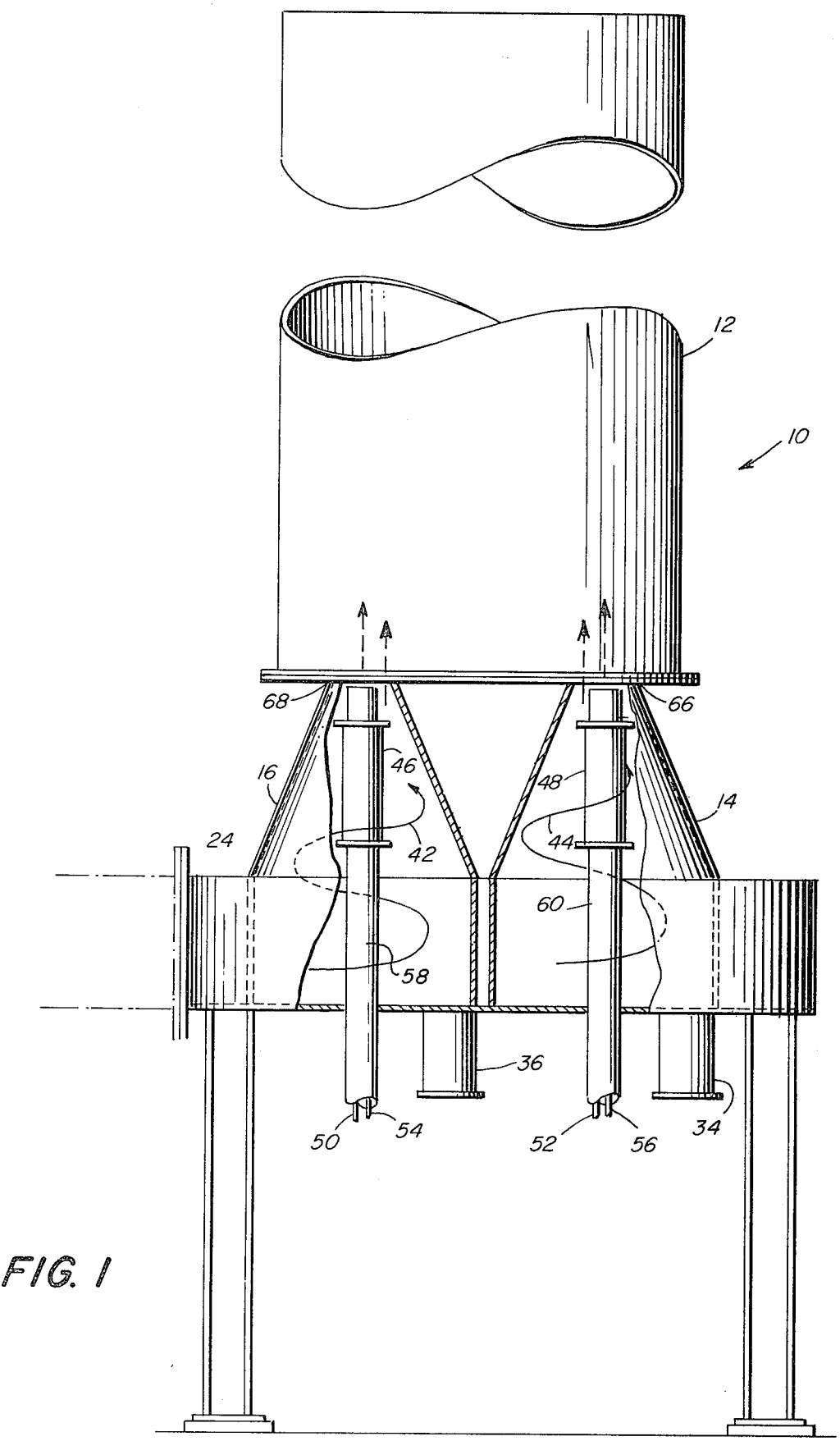
FIG. 1 is a cross-sectional side view of the reaction chamber of this invention.
Figure 2:
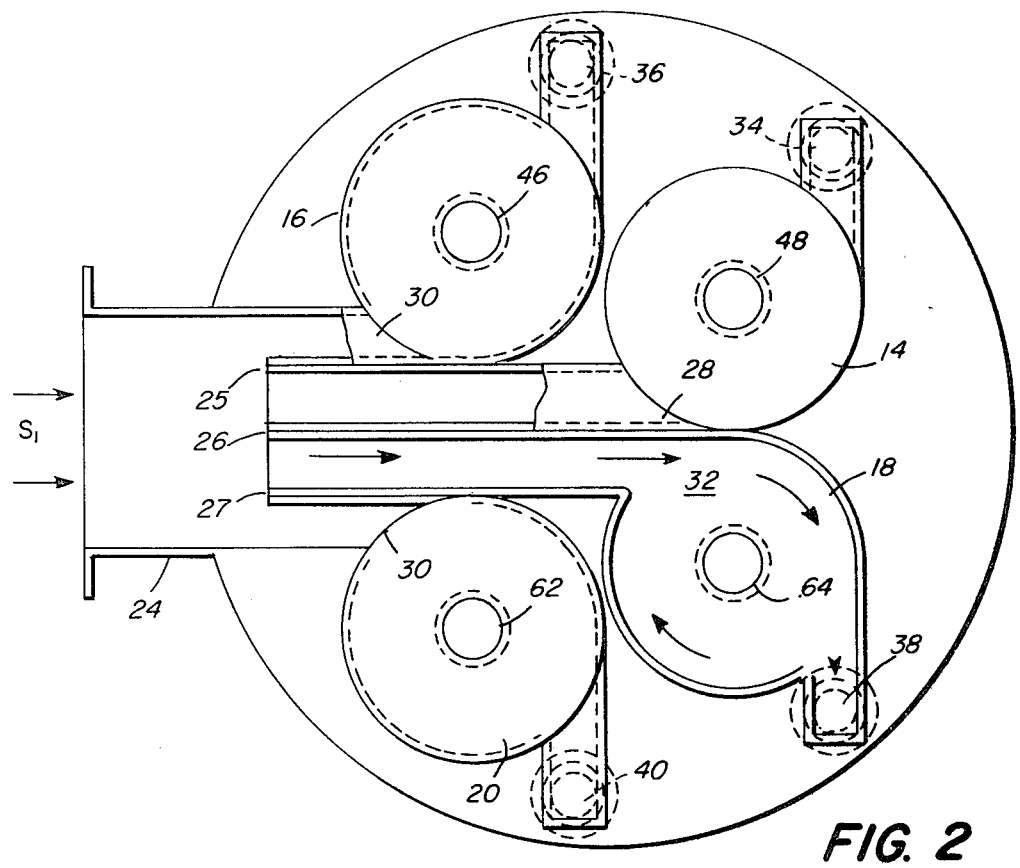
FIG. 2 is a cross-sectional view taken along line 2—2 of FIG. 1.

Typically, the gas streams treated in accordance with this invention comprise effluent gas streams from a furnace or smelter or the like. The effluent gas is introduced into a preliminary treatment zone preceeding a reaction zone in a manner to impose a spiral movement to the gas to permit removal of relatively large particles in the gas. The larger solid particles present in the effluent gas are forced outwardly from the center of the preliminary treatment zone by centrifugal forces and are collected in a small chamber having an opening on the inner wall at the bottom of the treatment zone. By removing these larger particles, the formation of undesirably large liquid droplets generated by impact of a reactant spray with these particles is minimized or eliminated. The gas then is introduced in the bottom of a reaction chamber wherein it is contacted with the reactant spray. The initial rotary motion of the gas stream effected by introducing it tangentially into the pretreatment zone dissipates as the gas passes upwardly from the pretreatment zone into the reactor wherein it contacts a liquid or slurry spray which emanates from a nozzle positioned within the upwardly moving gas stream after the larger particles have been removed therefrom. When the acid gas initially introduced into the reaction chamber is relatively free of larger particles, the spray nozzle can be located at a vertical height at or near the point of introduction of the acid gas into the reactor. Alternatively, if the gas to be treated is free of larger particles, it can be introduced directly into the bottom of the reactor without a preliminary treatment step.

The present invention permits the use of a plurality of spray nozzles for introducing a plurality of reactant sprays into the acid gas. This is effected by utilizing a plurality of independent preliminary treatment zones wherein larger particles are removed from the gas and wherein a spray nozzle is positioned in each zone upstream of the reactor. Since the larger droplets emanating from the nozzles travel a shorter distance from the nozzles than do the smaller droplets, the formation of large drops by impactation of the larger droplets from different sprays is eliminated. The use of multiple sprays is advantageous since it permits more complete gas-spray contact as compared with the use of a single spray. In prior art processes utilizing a downward flow of gas in a reactor, multiple spray nozzles are not used since large drops result from impactation of droplets emanating from different nozzles. This leads to undesirable accumulation of corrosive aqueous compositions in the bottom of the reactor.

While it is desirable to form a liquid or slurry spray having a uniform droplet size, in practice the size of the droplet varies over a relatively wide range. In the instance of the prior art, the larger droplets initially moved downward would pass through the entire length of the reactor without becoming completely evaporated and would collect on the bottom thereby causing damage to the reactor. In contrast, in the present invention, such droplets experience a higher residence time within the reactor since the effect of gravitational forces thereon is opposite to the gas entrainment velocity and they thereby become evaporated. The smaller particles which require less residence time to become evaporated experience shorter residence time. However, in any event, all of the droplets become evaporated prior to exit. Thus, in essence, the larger the droplet size of dispersion due to malfunctioning of a spray nozzle, the safer the system of this invention becomes.

The temperature of the gas may range from about 150° F. to 3000° F. or higher, although typically the temperature ranges from 250° F. to 1000° F. The flow rates may vary from as little as 1 cc/min to more than 1 million cfm and is limited only by the size and design of the reaction chamber. The gaseous contaminants will vary depending on the particular industrial operation. For example, fertilizer, aluminum and secondary aluminum operations generate large volumes of hydrogen fluoride and silicon tetrafluoride. Coking operations produce quantities of sulfur dioxide and lesser amounts of the nitrogen oxides. Hydrogen chloride is another by-product in the secondary aluminum process as well as in the demagging of primary aluminum in the incineration of waste chlorinated hydrocarbons and in municipal incinerators.

The gas stream will typically also contain entrained particulates which may consist of dust, uncombusted carbon, various metallic oxides such as silica, alumina, ferrites, etc. In refinery operations, entrained droplets of liquid hydrocarbons and derivatives may also be found in the effluent gas stream.

The gas stream is directed into the reaction chamber where it comes into contact with a solution or slurry of a basic material, that is, a compound or substance which has a basic reaction in water. The most common materials of this type are the alkali and alkaline earth metal oxides, hydroxides, carbonates and bicarbonates, but the invention is not limited to these. Specifically included within the scope of this invention are: $NaOH$, $Na_2CO_3$, $NaHCO_3$, $Na_2SO_3$; $KOH$, $K_2CO_3$, $KHCO_3$, $K_2SO_3$; $LiOH$, $Li_2CO_3$, $LiHCO_3$; $Ca(OH)_2$, $CaO$, $CaCO_3$; $Mg(OH)_2$, $MgO$, $MgCO_3$; $Ba(OH)_2$, $BaO$, $BaCO_3$; $Zn(OH)_2$, $ZnO$, $ZnCO_3$; $Ni(OH)_2$, $NiO$, $NiCO_3$; $Cu(OH)_2$, $CuOH$; $Fe(OH)_3$, $Fe_2O_3$, $FeCO_3$, $Fe_2(CO_3)_3$. Also included in this invention are the various ores which may comprise one or more of the above compounds and have a basic reaction in water. Exemplary of such ores are nepheline syenite and phonolite.

All of the above-mentioned alkali metal compounds, those of sodium, potassium and lithium, are very soluble in water and may be employed as an aqueous solution. The other basic compounds listed above range from sparingly soluble in cold water to virtually insoluble. These compounds may be employed in finely-divided form as aqueous slurries. Slurries of calcium and magnesium compounds can be utilized economically in the present process. Although the solutions and slurries are typically employed at or about room temperature, in the case of a basic material of borderline solubility, it may be desirable to employ a heated solution to keep the material in solution and thereby avoid the clogging problems which frequently accompany the use of slurries. In instances where the temperature is below about 250° F., particularly where the temperature is below the boiling point of water, it is desirable to superheat the solution or slurry. For example, by heating under pressure, the liquid temperature can be raised to about 1000° F. to insure there is adequate heat in the reaction chamber to completely and instantaneously vaporize all of the liquid and to leave a dry salt reaction product. However, it is preferred, and in most industrial operations it will be the case, that the heat supplied by the gas stream itself be adequate. Therefore, for convenience in this description of the invention, the gas stream will be referred to as a hot gas stream.

Upon contact between the hot gas stream and the aqueous solution or slurry, a somewhat violent reaction occurs. The water is vaporized cooling the gas stream, causing great turbulence and facilitating intimate contact between the acid gases and the basic material. An acid mist is created adjacent the spray nozzles because of the saturated environment and the high dew point of acid gases. This effects a longer residence time of the acid gases in the mist area adjacent the nozzles thereby resulting in more complete neutralization of the acid gases with the formation of the corresponding acid salts. Under the described conditions the reaction is quite rapid and the necessary residence time of the gas in the reactor ranges from about one millisecond to not more than about 2 seconds.

For example, if a lime slurry is used to quench a gas stream containing hydrogen chloride, the produce will be the salt calcium chloride ($CaCl_2$). The concentration of the basic material in the aqueous solution or slurry and the relative proportion of hot effluent gas to solution or slurry are variables which can be adjusted so as to insure that there is a stoichiometric equivalent or excess of basic material in the reaction chamber at any given time and for all the water to be evaporated to form a "dry" product gas. For example, for a given flow rate of effluent gas having a given concentration of acid gases, one can calculate by conventional means the necessary rate of addition of basic material to provide a stoichiometric equivalent or excess. Based on the flow rate and temperature of the effluent gas, one can also compute the volume of water or aqueous solution which can be heated and vaporized by the gas stream. Leaving a certain margin of error to account for inefficient thermal contact, suitable liquid flow rate may be chosen. The concentration of basic material in the solution or slurry necessary to provide the previously calculated rate of addition of basic material is then determined. If the liquid flow rate is increased, not to exceed the rate at which the liquid can be heated and completely vaporized, the concentration of basic material can be correspondingly decreased.

Upon leaving the reaction system of this invention, the gas stream typically is at a temperature of about 100°–500° F. and is substantially free of acid gases. The acid salts formed in the reaction chamber are entrained with the neutralized gas stream and are treated in a manner described below.

In one aspect of this invention, the initial effluent gas stream is directed to a manifold from which a plurality of smaller effluent gas streams are formed. Each effluent gas stream is directed into a separate initial treatment section in which the cyclonic motion of the gas stream is initiated and the larger particles are separated therefrom. In each of these initial sections, the hot gas is contacted with a spray of liquid or slurry to neutralize the acid gases therein. Operating in this manner permits increasing the capacity of a given reaction system and has the additional advantage of utilizing a plurality of liquid or slurry sprays independent from each other. This minimizes or prevents large droplet formation due to impaction of liquid or slurry droplets emanating from different nozzles while increasing reaction efficiency resulting from the improved liquid-gas contact.

This invention now will be described with reference to the accompanying drawings. The reactor 10 includes a main reaction chamber 12 and a plurality of initial reaction chambers 14, 16, 18 and 20. The effluent gas $S_1$ is introduced into manifold 24 having three internal walls 25, 26 and 27 thereby providing entrances 28, 30 and 32 respectively to reactors 14, 16, 18 and 20. Since the effluent gas is introduced into each initial reactor tangentially to the inside wall thereof, the introduced gas moves tangentially on the inner wall of each initial reactor in a cyclic motion and the larger particles in the gas migrate toward the wall and are collected in conduits 34, 36, 38 and 40. The upwardly moving gas streams represented by arrows 42 and 44 contact a spray of liquid or slurry of a basic material which emanates from spray nozzles 46 and 48 which are located within the venturies 66 and 68. As shown, the spray nozzles 46 and 48 comprise a two fluid spray each having a conduit 50 or 52 for introducing a gas such as air under pressure and a conduit 54 or 56 for introducing the basic liquid or slurry. The air and liquid or slurry are mixed at the exit of the nozzle 58 or 60 and pass into the gas streams 42 or 44 and droplets having a size generally within the range of about 20 microns to about 200 microns. In order to attain the desired average droplet size and to achieve an initial upward spray velocity within the range of about 2 to 10 ft/sec, preferably about 3 to 6 ft/sec, the nozzle pressure is maintained between about 40 to 200 psig, preferably 40 to 70 psig. Each of the spray nozzles 46, 48, 62 and 64 are vertically adjustable within their respective initial reaction chambers so that the contact time between the spray and the upwardly moving gas within the overall reactor 10 can be adjusted as desired. Generally, it is preferred that the head of the nozzles be positioned at or near the venturi section in each of the initial reactors such as venturi sections 66 and 68. By operating in this manner, the spray and gas are initially contacted after the larger particles have been removed from the gas and the respective sprays are independent of each other thereby minimizing large droplet formation due to droplet agglomeration. The respective sprays and hot gas then move into the main reaction chamber 12 wherein acid gas neutralization is rendered substantially complete.

Figure 3:
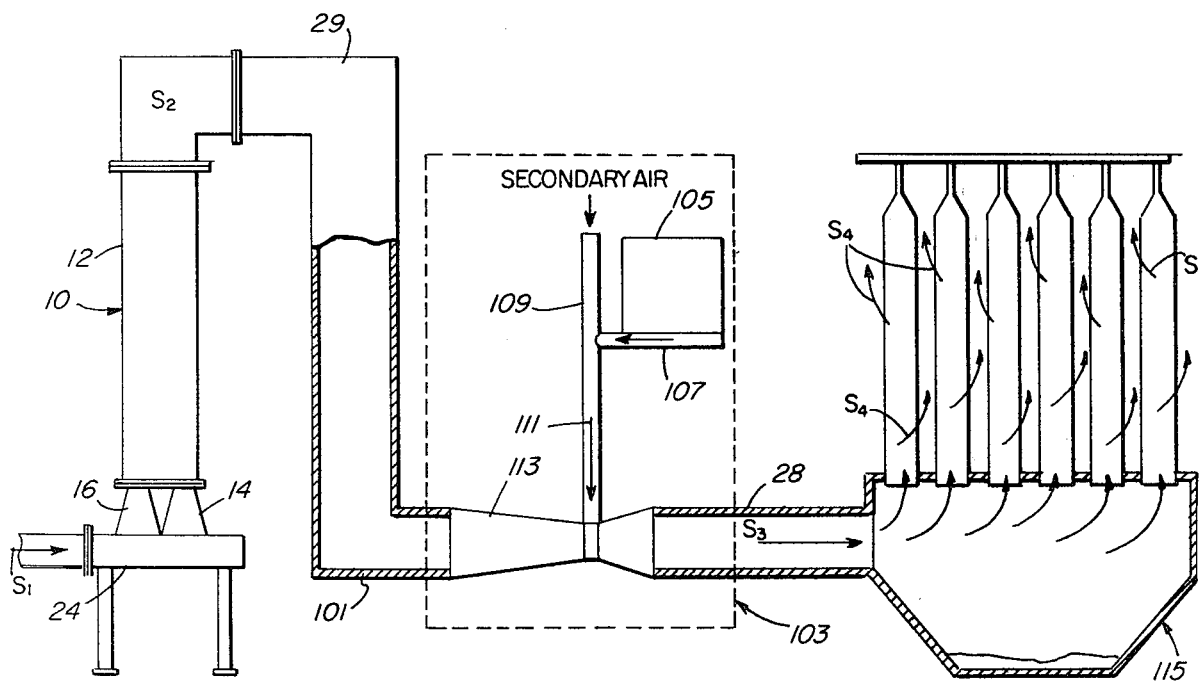
FIG. 3 shows the invention in an integrated process for removing acid gases and particulates from a gas stream.

Referring to FIG. 3, this figure illustrates a typical integrated process for abating acid gases from an effluent gas steam according to the present invention. The exit stream $S_2$ from reaction chamber 10 is directed downstream via conduit 101 to a mixing area 103 (shown in dotted outline) where a particulate material capable of sorbing the residual acid gases is blown or otherwise introduced into the gas stream. Although described herein as an "area" for purposes of discussion, it is not necessary that this be a definable structure per se. The particulate material may be blown or otherwise introduced into the gas stream at one or more points along the conduit 101 downstream from reaction chamber 10 in an amount sufficient to sorb the residual acid gases. A preferred means of adding the particulate material is by gradually feeding it from a container 105 into a conduit 107 and mixing it with secondary air introduced via conduit 109 to suspend the particles. The mixed particle-air stream is then directed via conduit 111 into the throat of a venturi 113 installed in conduit 101.

Especially preferred sorptive materials for this process are nepheline syenite and phonolite. The use of nepheline syenite to sorb small residual amounts of acid gases from a high-volume effluent gas stream is described in more detail in U.S. Pat. Nos. 3,721,066 and 3,808,774, and these disclosures are incorporated herein by reference. The aforementioned U.S. Pat. No. 3,808,774 directed to the in situ water activation of nepheline syenite is especially relevant to the present invention.

In particular, U.S. Pat. No. 3,808,774 describes a process for the abatement of acid gas emissions on the order of 100-500 ppm. from a hot effluent gas stream by the steps of: (1) quenching the gas stream with water to cool and humidify it; (2) introducing to the gas stream particulate nepheline syenite having a particle size of about 5-20 microns to sorb both moisture and acid gases therefrom, and (3) directing the gas stream bearing the nepheline syenite particles into a baghouse filter to remove the particulates together with the moisture and acid gases sorbed thereon.

As noted above, the gas stream $S_2$ leaving reaction chamber 10 is typically at a temperature of about 100°-500° F. and humidified; the residual acid gas content is on the order of 100-500 ppm. Thus, the gas stream is ideally suited for the practice of the aforementioned process. In accordance therewith, the humid gas stream is operative to wet the particulate nepheline syenite and thereby activate it to promote the selective sorption of acid gases. The activation and sorption occurs quite rapidly and is ideally completed by the time the gas stream and entrained nepheline syenite reach the means for separating the particulates. The rate of activation of nepheline syenite appears to be at least in part dependent on the relative humidity of the gas stream; and at a relative humidity of 20-30% or higher, the activation time is on the order of 1 millisecond. Although the activation time is reduced still further at higher relative humidities, ordinarily in the sorption process the amount of water introduced into the gas stream in chamber 10 is controlled so that the relative humidity of the stream $S_2$ does not exceed about 50%. The reason for this is that at higher relative humidities some clogging of the entrained particulates tends to occur along the flowpath and particularly in the baghouse filter. Once activated, particulate nepheline syenite sorbs acid gases from the gas stream in about 0.01-3.0 seconds.

This method of abating residual acid gas emissions has been shown to be about 95-99% effective as well as economical in removing acid gases present at concentrations of about 100-500 ppm. Because this sorption process is essentially a surface phenomenon, only a comparatively small portion of the total particulate material on the order of 7-15 wt. % is actively used; and it is not economical to employ this process at higher concentrations of acid gases. The fact that only 7-15 wt. % of the particulate material is available for sorption of acid gases must be taken into account in calculating the rate of addition of the particulate material necessary for approximately a stoichiometric equivalence based on the concentration of acid gases and flow rate of the gas stream. However, by first employing the quenching-reaction step which utilizes essentially all of the basic material to remove the bulk of the acid gases, the more selective and efficient sorption step becomes economical for cleaning up acid gas residuals. The overall effectiveness of the first stage, the reaction chamber-quenching process, and the second stage, the introduction of particulate nepheline syenite or similar material, in abating acid gas emissions is as high as 99.9%.

A preferred means of separating the gas stream from the particulate matter entrained therein is the use of a baghouse filter 115 as described in the aforementioned U.S. Pat. No. 3,808,774. The fact that residual acid gases and some moisture are removed from the gas stream due to sorption by the particulate material prior to reaching the baghouse filter means that corrosion of the filter is minimized. The reduction of moisture in the gas stream is also important in reducing fogging or misting conditions near the gas stream outlet. Moreover, the baghouse filter 115 removes not only the particulate nepheline syenite or similar material with moisture and acid gases sorbed thereon, but also removes the entrained salt particles from the first stage treatment and other particles which were initially present in the effluent gas $S_3$. Therefore, on leaving the baghouse, the exit stream $S_4$ generally will be ready for venting to the atmosphere.

As previously noted, the nepheline syenite, phonolite or similar material employed in the sorption step of this mode of practicing the integrated process may also be used as the basic material for the quenching-reaction step. The use of nephelite syenite, phonolite or similar natural ore as the basic material in the first stage as well as the sorptive material in the second stage of this process is particularly efficacious in the glass-making industry.

The salt by-product from the first stage and the particulate material with acid gases sorbed thereon collected in the baghouse may be combined and recycled directly into the glass-making furnaces. The high temperature in the furnaces promotes the decomposition of the ore-acid gas reaction product thereby regenerating the ore and the acid as raw materials for the glass-making operation.

EXAMPLE I

This example illustrates that this invention provides substantial reduction in reactor size without adversely affecting the desired neutralization process.

The data in Table I illustrate the comparison of the cocurrent upward flow process of this invention with the conventional cocurrent downward flow process.

In a typical neutralization process, the incoming hot acid gases are at a temperature of about 1000° C. while the largest spray droplet size is about 400 microns. The initial velocity of the spray from the nozzle is about 6 ft/sec while the terminal droplet velocity due to gravitational forces is about 5 ft/sec.

TABLE I

| Flow Directions | Time to Reduce Droplet Size | Velocity, ft/sec. | | | Distance, ft. | |
|---|---|---|---|---|---|---|
| | | Initial | Final | Average | | |
| Downward | 1.5 seconds to 350μ | 11 | 10.5 | 10.75 | 15 | |
| | 1.5 seconds to 260μ | 10.5 | 9 | 9.75 | 14.6 | |
| | 1.5 seconds to 120μ | 9 | 7 | 8 | 12 | |
| | 1.5 seconds to 50μ | 7 | 6.2 | 6.6 | 9.9 | |
| | | | | | 51.5 | Total |
| Upward | 1.5 seconds to 350μ | 1 | 1.5 | 1.75 | 2.6 | |
| | 1.5 seconds to 260μ | 1.5 | 3 | 2.25 | 3.4 | |
| | 1.5 seconds to 120μ | 3 | 5 | 4 | 6 | |
| | 1.5 seconds to 50μ | 5 | 5.8 | 5.4 | 8.1 | |
| | | | | | 20.1 | Total |

The data in Table I show that this invention permits utilizing a much smaller reactor to attain the same degree of dryness as obtained with a cocurrent downward flow reactor. Furthermore, in the upward flow reactor of this invention, the larger droplets experience a longer residence time in the reactor than do the smaller droplets thereby improving the overall dryness of the product gas while in the downward flow reactor, the residence time in the reactor for the larger droplets is less than that of the smaller droplets. Thus, the probability of liquid entering downstream treatment steps is much higher in the downward flow reactor.

We claim:

1. An apparatus for treating an effluent gas which gas contains acidic components of varying particle size which comprises:

(a) a first chamber having an inlet and an outlet, the outlet being positioned above the inlet, the chamber being configured as a truncated cone, the inlet in communication with the base of the chamber and substantially perpendicular to the longitudinal axis of the chamber, the inside walls of the chamber sloping upwardly and inwardly whereby the effluent gas introduced into the first chamber moves upwardly in a spiral path within said chamber effecting removal of the larger particles from the gas;

(b) a particle collection means disposed below the base of the first chamber to receive the particles removed in the first chamber;

(c) a second cylindrical-shaped chamber downstream of the first chamber and in communication therewith, the chamber configured to cause the gas to flow in an upward direction; and being free of structural interference from one end to the other;

(d) adjustable spray nozzle means
to introduce a spray of a basic material in a direction cocurrent with the upwardly moving effluent gas, said means including a discharge end, said end positioned at the apex of the first chamber such that the stream contacts the effluent gas after it has followed its spiral path and flowed into the second chamber; and
to control the residence time and to cause reaction of the basic spray and acidic components while the spray and the acidic components move upwardly in the second chamber to evaporate substantially all of the spray; and to form a dry stream with entrained acid salts, the dry stream exiting from the chamber being substantially free of acid gases;

(e) means for removing products of said reaction from the effluent stream after the stream has left the chamber.

2. The apparatus of claim 1 including venturi disposed between the means for introducing the spray and the second chamber.

3. The apparatus of claim 2 including a plurality of first chambers each having a nozzle for introducing the spray and means for directing a portion of said effluent gas to each of said chambers.

4. The apparatus of claim 1 including a plurality of said chambers each having a nozzle for introducing the spray and means for directing a portion of said effluent gas to each of said chambers.

* * * * *